Figure 2:
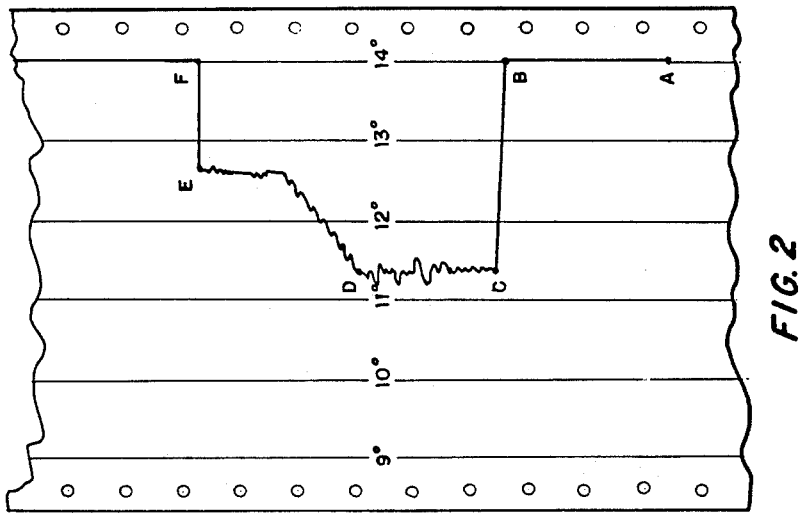

Oct. 23, 1962 P. OUVRARD 3,060,318
METHOD AND APPARATUS FOR THE TESTING OF FLUIDS
Filed Nov. 28, 1960

United States Patent Office 3,060,318
Patented Oct. 23, 1962

3,060,318
METHOD AND APPARATUS FOR THE TESTING OF FLUIDS
Paul Ouvrard, Donges, France, assignor to Societe Antar Petroles de l'Atlantique, Donges-(Loire Atlantique), France, a company of France
Filed Nov. 23, 1960, Ser. No. 72,133
14 Claims. (Cl. 250—218)

This invention relates to the cryoscopic analysis of fluids, i.e. determination of the composition, or the degree of purity of the fluid, by observing variations in the temperature at which a dissolved substance or impurity crystallizes or precipitates from the fluid.

While cryostatic analysis in principle should provide a highly sensitive and flexible means of continuously testing a fluid for purposes e.g. of automatic production control in chemical plant, the cryoscopic testing apparatus heretofore available have presented a number of drawbacks which have greatly detracted from the usefulness of the method. It is a general object of this invention to provide improved cryoscopic apparatus, and method, which will be more effective, sensitive and convenient in use than what has heretofore been available in the art.

One deficiency of the prior-art cryoscopic devices has arisen from the fact that the cooling of the test fluid, which is required in order to cause crystallization of the dissolved constituent and permit observation of the crystallization temperature, has usually been effected by external means, such as a cooling jacket or a refrigerator coil immersed in the fluid, and through which jacket or coil a coolant agent was passed. This has inevitably led to the presence of cold surface areas in the apparatus, upon which areas the crystals formed in the fluid would immediately settle and/or would form. The presence of crystals in certain areas of the apparatus rather than others resulted in a lack of uniformity in the fluid under test, as well as in the creation of large temperature differentials and thermal gradients in the apparatus and uncontrollable variations in the thermal conductivity of the apparatus, unreliable measurements have resulted. To avoid this some cryoscopic apparatus as heretofore built have included relatively complicated mechanical scraper means for removing the crystals from the surfaces on which they settled and for thus restoring some homogeneity in the body of tested fluid. However, in addition to the increased complication thus introduced, such expedients have been only partly successful in curing the afore-stated difficulties.

An object of this invention, accordingly, is to provide cryoscopic method and apparatus in which the objectionable formation of crystals on surfaces of the apparatus will be radically eliminated but in which the crystals will inherently form in the midst of the test fluid; another object is to eliminate the need of providing any separate cooling means, such as a cooling jacket or cooling coil. This object is attained by the direct injection of a cooling fluid, preferably gas under pressure, into the test fluid, and then discharging the cooling fluid from the test fluid ahead of the point at which the crystallization is observed. Other objects and advantages of the invention will appear as the disclosure proceeds.

In one aspect of the invention, there is provided cryoscopic testing apparatus which comprises a container defining a fluid flowpath, means for admitting tested fluid and cooling fluid into the flowpath at a first point thereof and for creating fluid flow along the flowpath, means for discharging the cooling fluid from the path at a second point thereof and means for discharging the test fluid from the path at a third point beyond said second point, means directing a beam of radiation across the flowpath between said second and third points, and means for receiving the beam and responsive to a drop in beam intensity due to turbidity in the test fluid consequent on a formation of condensed particles therein as a result of cooling, for emitting a corresponding signal.

The invention in another aspect provides a method of testing a fluid, which comprises admitting the test fluid with cooling fluid into a common flowpath at a first point of the path, creating fluid flow along the path, discharging the cooling fluid from the path at a second point, discharging the test fluid at a third point beyond the second point, directing a beam of radiant energy across the flowpath between the second and third points, receiving the beam, emitting a variable signal responsive to variations in the strength of the received beam, and controlling the admission of test fluid in accordance with variations in said signal.

It will be understood that observation of the instant at which turbidity sets in constitutes per se a detection of the fact that the crystallization temperature has been attained. Conveniently, a temperature probe sensing the temperature of the test fluid may be connected with a graph recorder for providing a continuous record of temperature variations.

Figure 1:
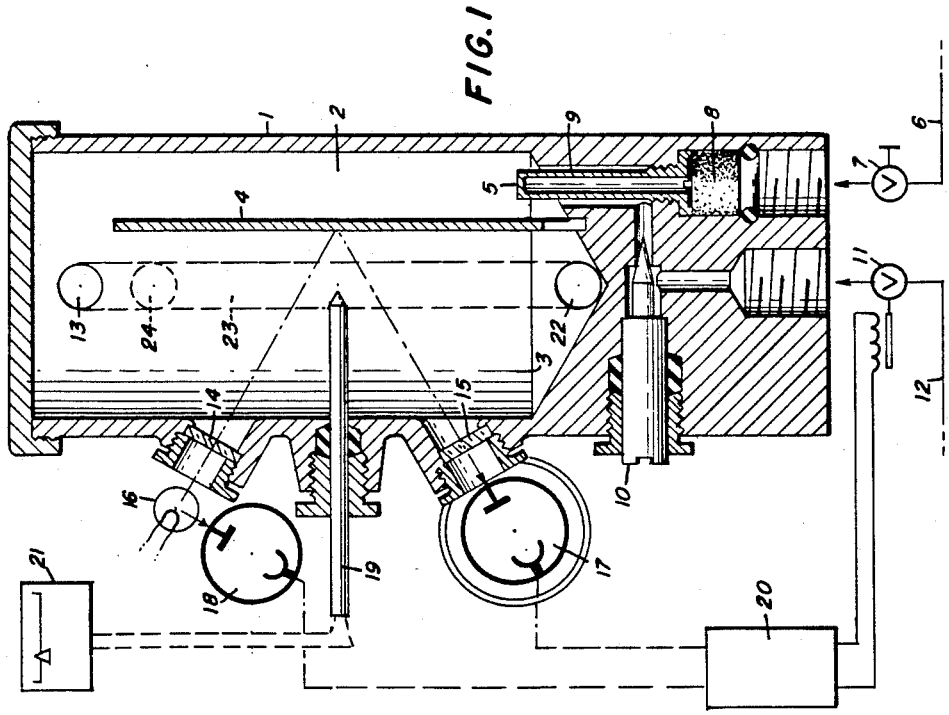

The invention will now be described in detail with reference to a specific embodiment of the improved cryoscopic testing apparatus, shown for purpose of illustration but not of limitation in the accompanying drawings, FIG. 1 is a simplified view of the apparatus in vertical section, with a schematic representations of the electric and fluid circuits connected with the apparatus;

FIG. 2 shows a typical fragment of a temperature graph obtained when using the apparatus shown in FIG. 1.

As shown in FIG. 1, cryostatic apparatus according to the invention comprises a generally cylindrical upstanding metallic casing 1 containing a vertical partition 4 extending up to a point short of the top of the casing and separating the inner space of the latter into a so-called mixing chamber 2 and an observation or test chamber 3. The chambers 2 and 3 communicate through the free space above the upper end of the partition 4 and as well through an aperture formed near the base of the partition. Projecting up through the base of the casing into mixing chamber 2 is a nozzle 5 for injecting carbon dioxide into the chamber for expansion therein. The carbon dioxide gas is delivered into the nozzle through a supply line 6 having a control valve 7, and through a filter element 8 provided at the base of nozzle 5.

The fluid to be tested, herein a liquid, is delivered into the mixing chamber 2 by way of an annular inlet passage 9 surrounding nozzle 5 coaxially with it. The rate of supply of the test liquid is controlled through a supply line 12 provided with a control valve 11 and connected through a union not shown with a passage formed through the center of the base of the apparatus casing and connected through a transverse passage with the annular inlet 9. A needle valve 10 adjustably extending into the said transverse passage serves to effect fine adjustment of the rate of supply of the liquid under test.

With the mixing chamber 2 filled with the liquid to be tested to a depth substantially corresponding to the top of partition 4, expansion of the carbon dioxide under pressure at the outlet of nozzle 5 at the base of the chamber 2 acts to expel said liquid so that a continuous circulation is established between the mixing and testing chambers 2 and 3 by way of the upper and lower communications therebetween. The main function of the partition is to permit a venting of the bubbles of $CO_2$ gas discharged in the body of the liquid within chamber 2, and thereby prevent such bubbles from modifying the turbidity of the material in the test chamber 3. The venting of the $CO_2$ is effected through a vent port 13 formed near the top of the casing 1 above the upper end of partition 4. The space at the upper end of the casing above partition 4 constitutes in effect a separating zone or chamber in which the coolant $CO_2$ gas is separated from the fluid under test. It will be apparent that if desired, such separation chamber may be provided separate, and connected through suitable conduits with the mixing and test chambers 2 and 3.

Formed in the side wall of casing 1 adjacent the test chamber 3 are two spaced window openings sealed with gas-tight plates 14 and 15 made of a material transparent to the radiations used, e.g. glass. In the embodiment shown the source of radiations is a light bulb 16 connected to a suitable source of electric power. The light beam from source 16 is directed partly through window 14 into test chamber 3 to illuminate the fluid under test therein. The light is reflected from partition 14 and the arrangement is such that the reflected beam issues out of the casing through window 15 to strike a photo-cell 17 mounted in suitable position outside the casing. Another part of the light emitted from source 16 is directed to strike a further photo-cell 18 serving as a reference cell. The facing surface of partition 4 may be provided with a suitable mirror or made reflective as by being made of stainless steel and burnished.

Projecting into test chamber 3 through a connecting fixture shown inserted between the windows 14 and 15 is a thermometer probe 19 which contains a thermistance as the temperature-responsive element therein, with the sensitive point thereof being positioned substantially midway of the path of the light beam through test chamber 3, within an area where the flow rate and turbulence of the liquid under test are high, so that the temperature value measured by the probe will represent substantially the average value of the temperature of the liquid.

The output voltages from photo-cells 17 and 18 applied in opposed relationship to a common comparator-amplifier circuit 20, which delivers a signal when the output from cell 17 drops a predetermined amount below the output of cell 18. The output signal from amplifier 20 is applied to a solenoid operating the valve 11 in the liquid feed line 12, so as to open the valve. As will be understood, the signal indicates the fact that turbidity has occurred in the liquid under test due to the formation of crystals or precipitate. The thermometer probe is connected with a conventional temperature recording device 21.

An outlet opening 22 in a side of casing 1 at the bottom of test chamber 3 serves for the discharge of the tested liquid. The opening 22 is connected with a rising pipe 23 the upper end opening 24 of which is positioned outside the apparatus at an elevation somewhat less than that of the top of partition 4. Thus in steady operation the free liquid level in the apparatus becomes established substantially adjacent the upper end of partition 4. The carbon dioxide vent opening 13 may, as shown also be connected with the liquid discharge pipe 23.

In operation, liquid is first admitted into the apparatus through valve 11, needle valve 10 and annular outlet 9 up to the level determined by the overflow outlet 24. Carbon dioxide gas under pressure is then delivered by opening valve 7 into the jet nozzle 5. The carbon dioxide expands in the body of liquid within mixing chamber 2 and lowers the temperature of the liquid until crystallization begins. At the same time the jet of gas causes a high degree of turbulence of the test liquid in the mixing chamber, and owing to the gas pressure and turbulence the liquid is forced from chamber 4 into test chamber 3 over the top of partition 4 then back through the aperture in the base of partition, producing a circulation of liquid which rapidly equalizes the temperature within the body of liquid in both chambers.

The precise temperature at which micro-crystals first form in the liquid depends on the degree of purity of the liquid, decreasing as the purity decreases. The formation of the crystals is detected by the photo-electric sensing device as follows. While the initial formation of the crystals occurs in mixing chamber 2 near the carbon dioxide inlet, the crystals are rapidly conveyed into the test chamber 3, and cause turbidity of the normally clear liquid contained in said chamber. The photoelectric system is normally adjusted so that the electric output of photocell 17 due to illumination by the light beam from source 16 reflected from partition 4 through the body of liquid equals the output of standard cell 18 due to direct illumination from the source. In this condition the output from the differential amplifier or comparator 20 is at a null. When however micro-crystals are present in the liquid in chamber 3, the amount of light reaching cell 17 through the liquid drops substantially, and its output decreases accordingly. Amplifier 20 then delivers an output signal which is applied to the operating solenoid of valve 11, opening said valve. This admits fresh liquid into the apparatus, which replaces a corresponding amount of the old liquid charge which is evacuated through outlet 22 due to the overflow action previously described, so that the level of liquid in the apparatus remains unchanged. The introduction of fresh, warm liquid continues until the temperature of the liquid charge rises above crystallization point, at which time the liquid in chamber 3 becomes clear again, so that the output of differential amplifier 20 drops to zero, and inlet valve 11 closes. The cyclic operation thus described is repeated. The over-all operation is such that the degree of turbidity is held between prescribed limits.

While the valve 11 may be made continuously operable if desired, so as to cause a gradual adjustment of the liquid delivery in proportion to the departure of the electrical output of circuit 20 from null, it is satisfactory to operate the valve 11 on an all-or-nothing basis as described above, especially since the operating rate of the valve will usually be approximately proportional to the output of circuit 20, i.e. to the degree of turbidity detected.

In the above operation, the carbon dioxide gas rising through the mixing chamber 2 is continually being discharged through gas outlet 13 in the free space present above the upper level of the liquid.

It is recalled that the temperature of a liquid during a cooling cycle remains constant throughout the time crystallization proceeds. In practice, however, this phenomenon may be disturbed by the occurrence of a supercooling effect. In the apparatus of the invention supercooling is prevented due to the turbulence induced by the expansion of the $CO_2$. Therefore, the temperature chart recorded on recorder 21 in response to the temperature sensed in the test chamber by temperature probe 19, indicates with considerable accuracy the temperature variations incident on variations in purity of the successive batches of liquid admitted into the apparatus and sampled therein. Thermistor temperature probes are available on the market which respond to temperature variations of 1/100 degree C.

Thus, it has been found that when using the apparatus for continually monitoring the purity of a liquid hydrocarbon such as paraxylene, the purity can be monitored to within 1/10 of one percent, especially within the purity range of from 90 to 100%. It will be understood from the foregoing description of operation of the apparatus that the rate of admission of liquid samples into the apparatus is directly determined by the temperature of the liquid being tested, and by the rate of delivery of carbon dioxide gas. Assuming the rate of delivery of carbon dioxide is maintained substantially constant, it may be desirable in some cases to subject the tested fluid to a preliminary cooling prior to its admission into the apparatus, whereby the rate of delivery of the liquid, and the frequency of the successive sampling operations, may be increased. It may be noted that the rate of delivery and sampling frequency are not substantially influenced by the capacity of the apparatus and by any heat losses to the surrounding atmosphere.

A typical fragment of a temperature graph as recorded by means of the apparatus described is illustrated in FIG. 2, when monitoring the purity of a continuous production of paraxylene. In the graph, the temperature is plotted on the horizontal coordinate, and time along the vertical coordinate. The flat section AB of the graph corresponds to the period where the apparatus is being initially filled with liquid to be tested. At the time represented by point B, the injection of $CO_2$ gas commences, producing a near-intantaneous drop of temperature in the body of liquid of somewhat more than 2.5 degree centrigrade, whereupon (at point C of the graph) crystallization sets in, and the temperature of the liquid remains substantially constant as indicated by section CD of the graph. Through the optico-electrical mechanism described the formation of microcrystals in the body of liquid causes opening of the inlet valve 11 (at point D), so that a fresh amount of paraxylene is admitted, causing a rise in the temperature of the liquid, as indicated on the graph. The graph then sohws another flat i.e. constant-temperature portion D'E, indicating a fresh formation of crystals in the newly-sampled liquid. This indicates that the additional paraxylene stock admitted into the apparatus at point D is purer than previously, since the crystallization temperature rises with purity. At E the $CO_2$ injection has been cut off, whereupon the temperature promptly drops back to its initial value as shown at F.

It will be understood that various modifications may be made in the single embodiment illustrated and described without exceeding the scope of the invention. Thus the apparatus can be used to test gases as well as liquids, in case the gas to be tested contains some condensable constituent capable of reducing the transparency of the body of gas in the test chamber to whatever radiations are used. Various cooling fluids other than carbon dioxide may be used, such for example as the halides known as freons. In some cases the cooling fluid used may be of the same composition as the tested fluid, but in a supercooled condition; and in some cases the cooling fluid may be air.

While it is not generally necessary to provide heat isolation for the apparatus of the invention, some degree of isolation may sometimes prove desirable for preventing the formation of ice on the walls thereof, and the window openings 14 and 15 may be provided with two spaced transparent walls with a vacuum in between. As earlier mentioned, the input regulating valve 11 may be of a gradually adjustable type, and a servo-motor system including a reversible electric motor energized from the output of comparator amplifier 20 may be provided for operating the valve.

It will be apparent that the testing apparatus of the invention is suitable for use as a means of automatically and continuously controlling the manufacturing process of the substance under test, as by deriving e.g. from the thermometer probe 19 an output signal serving to modify some parameter of the process in a predetermined sense whenever the sensed temperature drops below a prescribed value indicative of minimum permissible purity of the manufactured product. Various other changes and refinements will suggest themselves to those familiar with the art. The radiant energy used to detect the formation of crystals or other solid particles is not necessarily light, since various other radiations may be used.

What is claimed is:

1. A fluid testing system comprising means defining a fluid flowpath, means for admitting tested fluid and cooling fluid into the flowpath at a first point thereof and for creating fluid flow along said flowpath, means for discharging the cooling fluid from the path at a second point thereof, and means for discharging the tested fluid from the path at a third point thereof beyond said second point, means for directing a beam of radiant energy across the flowpath through the fluid between said second and third points, means for receiving the beam and emitting a variable electric signal responsive to variations in the strength of said beam, and means for indicating the temperature of the fluid between said second and third points.

2. A fluid testing system comprising means defining a fluid flowpath, means for admitting tested fluid and cooling fluid into the flowpath at a first point thereof and creating fluid flow along said path, said test fluid admitting means including an electrically-operated valve, means for discharging the cooling fluid from the path at a second point thereof, means for discharging the test fluid from the path at a third point thereof beyond said second point, means for directing a beam of radiant energy across the flowpath between said second and third points and means for receiving the beam and responsive to a drop in beam intensity for emitting an electric signal to actuate said valve, whereby to admit a fresh sample of test fluid on occurrence of turbidity in the test fluid due to cooling by the cooling fluid, and thereby maintain said turbidity within a prescribed range.

3. A liquid testing apparatus comprising a container including a mixing zone and a testing zone therein communicating through a passage at the top thereof, means for admitting said liquid and cooling gas under pressure into the mixing zone at the bottom thereof in an upward direction whereby the liquid is caused to flow through said passage into the testing zone, a vent adjacent the top of said zones for discharging the cooling gas, a liquid outlet adjacent the bottom of the testing zone, means for directing a beam of energy through the liquid in the testing zone, and means for receiving the beam and emitting a variable electric signal in response to variations in beam strength due to variations in turbidity of the liquid as a result of its cooling by the cooling gas.

4. Apparatus as claimed in claim 3, which comprises coaxial annular inlet passages for admitting said liquid and cooling gas.

5. Apparatus as claimed in claim 3, having a vertical partition therein for defining said zones, said partition extending short of the upper end of the container for providing said communicating passage.

6. Apparatus as claimed in claim 5, including a riser pipe connected with said liquid outlet for maintaining in said container a body of liquid up to a level substantially corresponding with that of said passage.

7. Apparatus as claimed in claim 3, which comprises a pair of apertures in the container wall adjacent said testing zone, transparent means sealing said apertures, a light source outside the container directing a beam through one aperture, and a photo-cell outside the container for receiving the beam issuing out of the other aperture after having passed through said testing zone.

8. Apparatus as claimed in claim 3, which comprises a temperature probe extending through a wall of the container into the testing zone.

9. Apparatus as claimed in claim 7, wherein said apertures are formed in spaced positions of a common wall of the container, and said beam is so directed through said one aperture as to be reflected from an inner surface of the container through the other aperture.

10. Apparatus as claimed in claim 7, which comprises a reference photocell arranged to receive a beam directly from the source, and electric circuit means for comparing the electric outputs of both cells and emitting a signal responsive to a departure in the value of said first cell output from the value of the reference cell output.

11. Apparatus as claimed in claim 3, comprising an electrically operated valve for controlling the admission of said liquid, and circuit means responsive to said electric signal for operating said valve.

12. Apparatus as claimed in claim 8, including a recorder device connected with the temperature probe for recording the variations in temperature sensed thereby.

13. Apparatus as claimed in claim 3, wherein said tested liquid is a hydrocarbon.

14. Apparatus as claimed in claim 3, wherein the cooling gas is carbon dioxide.

References Cited in the file of this patent

UNITED STATES PATENTS

| | | |
|---|---|---|
| 1,883,116 | Tomlinson | Oct. 18, 1932 |
| 2,376,209 | Turin | May 15, 1945 |
| 2,466,696 | Friswold et al. | Apr. 12, 1949 |
| 2,716,371 | Still | Aug. 30, 1955 |